(No Model.)

T. A. & A. A. CONNOLLY.
MAIN FOR CONVEYING GAS UNDER PRESSURE.

No. 330,294. Patented Nov. 10, 1885.

UNITED STATES PATENT OFFICE.

THOMAS A. CONNOLLY AND ANTHONY A. CONNOLLY, OF WASHINGTON, D. C.

MAIN FOR CONVEYING GAS UNDER PRESSURE.

SPECIFICATION forming part of Letters Patent No. 330,294, dated November 10, 1885.

Application filed October 13, 1885. Serial No. 179,812. (No model.)

*To all whom it may concern:*

Be it known that we, THOMAS A. CONNOLLY and ANTHONY A. CONNOLLY, citizens of the United States, residing at Washington city, in the District of Columbia, have invented certain new and useful Improvements in Mains or Pipes for Conveying Gas Under Pressure; and we do hereby declare the following to be a full, clear, and exact description of the invention, such as will enable others skilled in the art to which it appertains to make and use the same, reference being had to the accompanying drawings, wherein—

Figure 1:
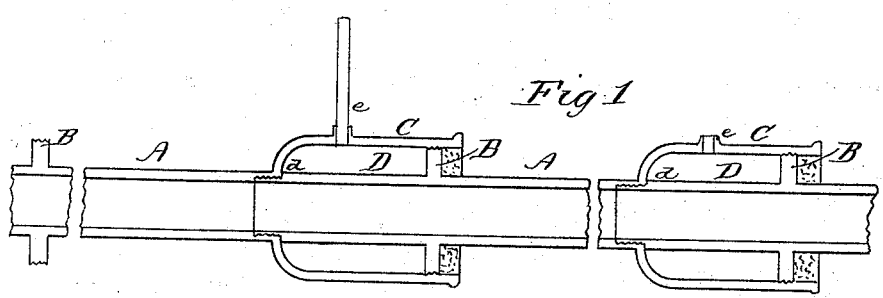
Figure 2:
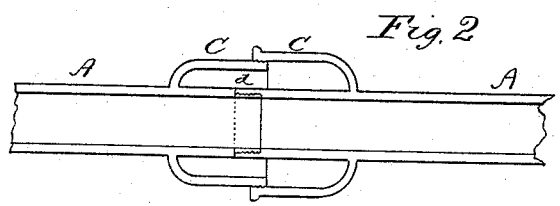
Figure 3:
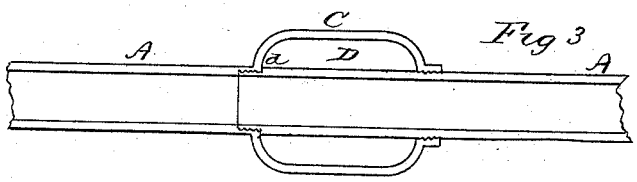

Figures 1, 2, and 3 are longitudinal sectional views of a gas-conduit embodying our invention.

This invention has relation to systems for conveying gas under pressure, and has for its object the provision of a novel construction of the collars or casings which are applied to the joints of the high-pressure mains, and which are chambered or recessed for the reception of the leakage gas.

Our invention consists, essentially, in the combination with the sections of a high-pressure gas main or conduit, of a bowl formed integral therewith and at one end thereof, said bowl constituting a joint-casing, which encircles or embraces the joint produced by the coupling or connection of the adjacent section and provides an annular cavity or recess for the reception of the leakage gas, said casing or bowl being provided with means for connecting thereto a pipe or pipes leading to a low-pressure conduit or elsewhere.

Our invention further consists in the novel construction and combination of parts, as hereinafter more fully described and claimed.

Referring to the accompanying drawings, wherein Fig. 1 represents a simple and efficient plan for carrying our invention into effect, A A designate sections of pipe or tubing constituting the main or high-pressure conduit of a gas-conveying system. Each of these sections is externally threaded at one end for connection with the adjacent end of the section to which it is to be coupled. At a short distance from the threaded end of the section an annular flange or collar, B, is formed or attached to the pipe. The other end of each section is enlarged or widened, as shown at C, in such a manner as to form a bowl, through the center of which is passed the externally-threaded end of the pipe or conduit adjacent thereto. At the inner portion of the bowl C the pipe on which it is formed is internally threaded for the reception of the end of the next pipe. At or near its outer end the bowl C is internally threaded to receive and hold the flange or collar B, which is threaded on its periphery, the threads being of corresponding pitch with those on the end of the pipe, so that the connection of two pipes themselves and of a flange and bowl may be made at one and the same time. The bowl C is formed or provided with one or more apertures or nipples for the connection of escape-pipes to lead the gas to the low-pressure main, to the open air, or elsewhere, as may be desired.

When the flange B is connected to the bowl C, or passed within the same, a recess or chamber is left between its outer surface and the mouth of the bowl. In this recess any suitable packing may be placed to render the seam close and tight. The bowl is of considerably larger diameter than the external diameter of the body of the pipe, and hence when the pipes are coupled together an annular chamber, D, is formed around the end of the pipe and between it and the inner surface of the bowl, this cavity or chamber serving to receive the gas escaping from the joint $d$, whence it is conducted off, as may be required, by way of the branches $e$.

Various modifications of the construction above described are within the spirit of our invention. Thus, as shown in Fig. 2, the sections of the conduit may have bowls formed at either end, one bowl being coupled to and embracing the mouth of the other. As also shown in said Fig. 2, the ends proper of the pipes or sections may project beyond the base of the bowl and be coupled or screwed together at their ends.

As shown in Fig. 3, the flange B, near one end of a section, may be dispensed with, and the bowl formed with its mouth or lip turned or curved inwardly, so as to screw directly upon the adjacent pipe.

While we have described the parts or sections as being screwed together, we do not wish to limit ourselves to any special means for coupling or connecting the pipes, our invention being, broadly, the combination, with the sections of a gas-conduit, of enlarged bowls formed at one or both ends thereof, and forming receptacle for leakage gas.

What we claim as new is—

1. A high-pressure gas-conduit composed, essentially, of tubular sections A A, coupled together and formed with chambered casings encircling the coupled joints and adapted for the reception of leakage gas, said casings being made integral with the main sections A A.

2. In gas-conveying systems, the combination, with the conduit-sections A A, connected together at their adjacent ends by couplings, of the bowls C, formed integral with the respective main sections, and provided with means, substantially as described, for conveying off the leakage gas, and having annular cavities between their inner surfaces and the body of the sections formed and adapted for the reception of said gas.

3. A gas-conveying conduit consisting of sections of pipe coupled together and having chambered boxes or collars encircling their joints, said boxes or collars being made integral with the main section and adapted for the reception of leakage gas, and being provided with means for the escape of said gas.

4. A gas-conduit section formed with a bowl, C, at one end and a flange or collar at or near the other end, said collar and bowl being made integral with the main conduit-sections, and means for coupling, all so constructed and arranged that when the sections are coupled together said bowl will form a chamber around the joint for the reception of leakage gas.

5. The combination of the sections A A, one of said sections having a bowl, C, formed at one end with the flange or collar B, encircling the other section and adapted to enter and close the mouth of said bowl.

6. In a gas-conveying system, the combination of the pipes A A, each having at one end a bowl, C, and at the other end a flange, B, formed integral therewith, said pipes being threaded at or near either end to form screw-connections, substantially as described.

In testimony whereof we affix our signatures in presence of two witnesses.

THOMAS A. CONNOLLY.
ANTHONY A. CONNOLLY.

Witnesses:
R. E. GRANT,
H. A. HALL.